:::: {.columns}
::: {.column}
(12) United States Patent
Usui et al.
:::
::: {.column}
(10) Patent No.: US 6,183,677 B1
(45) Date of Patent: *Feb. 6, 2001
:::
::::

(54) METHOD OF MANUFACTURING ABRASIVE SHEET WITH THIN RESIN FILM

(75) Inventors: Akira Usui; Yukio Yoshida, both of Tokyo (JP)

(73) Assignee: Kovax Corporation, Tokyo (JP)

( * ) Notice: Under 35 U.S.C. 154(b), the term of this patent shall be extended for 0 days.

This patent is subject to a terminal disclaimer.

(21) Appl. No.: 09/236,566

(22) Filed: Jan. 26, 1999

Related U.S. Application Data

(62) Division of application No. 08/715,310, filed on Sep. 18, 1996, now Pat. No. 5,928,760.

(30) Foreign Application Priority Data

Oct. 31, 1995 (JP) .................................................. 7-282677

(51) Int. Cl.[7] .................................................. B29C 41/22
(52) U.S. Cl. ........................................... 264/131; 427/180
(58) Field of Search ................................... 264/138, 130, 264/131, 135, 160, 255, 241; 427/180

(56) References Cited

U.S. PATENT DOCUMENTS

| | | | |
|---|---|---|---|
| 2,220,140 | * 11/1940 | Bartling et al. | 51/303 |
| 2,899,288 | * 8/1959 | Barclay | 51/293 |
| 5,336,348 | * 8/1994 | Mindler | 156/231 |
| 5,730,084 | * 3/1998 | Kacic | 119/165 |

* cited by examiner

*Primary Examiner*—Jan H. Silbaugh
*Assistant Examiner*—Edmund H. Lee
(74) *Attorney, Agent, or Firm*—Evenson, McKeown, Edwards & Lenahan, P.L.L.C.

(57) ABSTRACT

An abrasive sheet has an abrasive particle layer formed on a surface of a thin flexible resin film. The abrasive sheet is produced by the steps of preparing a releasable film, forming a thin flexible resin film layer on a release agent applied surface of the releasable film and forming an abrasive particle layer on an upper surface of the resin film layer. Thereafter, the resin film having the abrasive particle layer formed thereon is removed from the releasable film, and the resin film having the abrasive particle layer formed thereon is cut into any suitable size. The abrasive sheet can provide higher polishing power during the polishing operation, but it polishes a surface while tracing or following any orange peel on the surface. Therefore, the abrasive sheet is effective for use as the polishing tool that can replace the fine compound buffing process currently utilized in the automobile repairing industry.

2 Claims, 4 Drawing Sheets

$1 \mu m$ $\quad$ $100 \mu m$

METHOD OF MANUFACTURING ABRASIVE SHEET WITH THIN RESIN FILM

This application is a divisional of application Ser. No. 08/715,310, filed Sep. 18, 1996 now U.S. Pat. No. 5,928,760.

BACKGROUND OF THE INVENTION

1. Field of the Invention

The present invention relates to an abrasive sheet and a method of manufacturing the same, and more particularly, to such an abrasive sheet that is effective for use in an automobile repairing industry, and method of manufacturing the same.

2. Description of Related Art

In the present state of the art of the automobile repairing industry, various kinds of techniques are utilized for repairing external plates of automobiles such as bonnets, doors and the like, when damaged due to automobile accidents, within a shorter period of time and at lower cost in order to meet the customer's demands. In the prior art, the damaged portions on the external plates of the automobiles are typically repaired in the following manner.

Initially, a damaged recess portion of a plate is processed for restoration to its original shape by a panel beating process. Thereafter, any previous paint, if remaining, on the surface to be repaired is removed by using, for example, an abrasive paper of coarse grains to such degree that an underlying steel material becomes exposed. Then, cleaning of the surface is effected using some solvent, and the surface is coated with a putty. After the putty is hardened up to such point that the sanding can be done, the surface is sanded to a flat condition by use of the abrasive paper of coarse grains. Then, the surrounding surface thereof is flattened with the use of the abrasive paper by feather edging and giving teeth. Next, the surface is coated with a primer surfacer by a spray gun, and after it is hardened, the abrasive paper of fine grains is used for smoothing the surface. Then, the surface is coated with an over-coating paint by a spray gun. Furthermore, any dust, if present on the surface, is removed by using a water-proof abrasive paper of very fine grains, and a skin or surface conditioning is effected using the water-proof abrasive paper and/or a fine compound buffing. Finally, a polishing is performed by using a very fine and/or a super fine compound.

In the prior art repairing procedure as described above, due to the spraying operation of the over coating paint by the spray gun in atomized form, it is unavoidable that there is an orange peel always produced after hardening and drying of the paint material. More particularly, such an orange peel may have a different form or shape depending upon several factors including viscosity, surface tension and fluidity of the paint material when a particle in atomized paint material is re-combined with other particles on the painted surface; velocity of volatilization of the solvent; diameter of the spray gun; pressure and flow rate of air; flow rate of the paint material; distance to the surface to be painted; angle of atomization; and the surrounding conditions such as temperature, humidity, etc,. Although it is normally required in a repair-painting operation that an orange peel on a newly painted surface should substantially be matched to the existing orange peel on the surrounding area, there may frequently be some difference therebetween due to the effect of the factors as above. In order to match both orange peels, it is common practice to polish the newly painted surface in a buffing process using a compound for closely conforming to the surrounding surface. Such operation is referred to as "surface-conditioning" or "skin-conditioning".

The surface-conditioning is generally effected in such manner that if the orange peel is finer and larger in number than that of the surrounding surface, then a raised portion is firstly sanded by using a water-proof abrasive paper of No. 1000 (P1000) to No. 2000 for conforming to the surrounding surface. Then, any sanding trace produced by this water-proof abrasive paper is eliminated by using a fine compound buffing process. In addition, any polishing trace produced by this fine compound buffing is eliminated, and at the same time, the surface-conditioning is effected with the use of a very fine compound buffing process. Finally, a polishing is conducted by using a super fine compound.

In general, in the automobile repairing industry, only a few repair shops or painters have a complete painting booth equipped with an air cleaner, but most of the repair shops or painters have a simplified painting booth or no such booth. Therefore, it may frequently happen that fine particles or dust in the air are deposited on the painted surface and tend to absorb the paint on the surrounding surface to form a raised portion on the surface or make the surface rough. When such a surface is sanded by using the prior art water-proof abrasive paper, some sanding trace may remain thereon. In addition, the roughness on the recess portion can not be eliminated by use of such water-proof abrasive paper. Such roughness on the recess portion and the sanding trace can be eliminated only by using the compound, thereby effecting surface-conditioning.

The buffing process is generally performed using a polisher which is electrically or pneumatically driven at the rotation speed of 1500 to 3000 rpm. A towel buff, a wool buff or a sponge buff is commonly used between the polisher and the painted surface. A compound used in the buffing process consists of an emulsion including particles that have lower hardness and are likely to be worn and collapsed for the purpose of providing the gloss. The buffing process is performed while dropping such liquid compound onto the painted surface.

The water-proof abrasive paper of the finest grains currently available is No. 2000. Any sanding trace produced by such abrasive paper is generally eliminated by the buffing process using the compound. Because of free particles used for such buffing process, the polishing efficiency is lower, and a longer period of time and much labor are necessary. On the other hand, the sanding process using the abrasive paper or cloth provides higher efficiency, but the sanding trace produced thereby becomes coarser. Furthermore, such abrasive paper or cloth can sand only a raised portion of the orange peel, but not a recess portion thereof.

In the prior art, another abrasive member has been proposed in which a flexible adhesive layer having abrasive particles incorporated therein is deposited onto a film or any other layers. Such an abrasive member has a deficiency in that the abrasive particles may be removed earlier, leading to loss of the abrasion capability, and that the sanding of a recess portion can not be attained. A further abrasive member has also been proposed in which abrasive particles are deposited onto a sponge pad in the same manner as the case where they are deposited onto a paper or cloth. Such abrasive member, however, is not practical because of coarse sanding trace and a lot of waste produced after it is used.

In the prior art, the buffing process including the surface-conditioning using the compound takes the longer time of, for example, at least 20 minutes, and even 90 minutes if an orange peel is present.

In view of the above, the object of the present invention is to provide an abrasive sheet, and method of manufacturing the same, which can solve the prior art problems as described above. More particularly, the object of the present invention is to provide a new and improved abrasive sheet which provides higher abrasive capability or sanding power and produces a finer sanding trace which can easily be polished and smoothed out with a compound. The abrasive sheet can completely sand any recess portion of the orange peel.

SUMMARY OF THE INVENTION

In order to fulfill the object as above, the present invention provides an abrasive sheet comprising a thin flexible resin film and an abrasive particle layer formed on the surface of said resin film. According to one embodiment of the present invention, said abrasive particle layer includes a flexible resin layer which sandwiches abrasive particles and an adhesive layer for affixing these abrasive particles to said resin film between the flexible resin layer and said resin film.

According to a preferred embodiment of the present invention, said resin film has thickness of between 10 and 100 $\mu$m, 100% M of between 10 and 200 Kgf/cm$^2$, tensile strength of between 200 and 900 Kgf/cm$^2$, and elongation of between 250 and 1000%; and said abrasive particle layer has abrasive particles of No. 400 (P400) to No. 4000.

According to a more preferred embodiment of the present invention, said resin film has thickness of between 20 and 50 $\mu$m, 100% M of between 15 and 30 Kgf/cm$^2$, tensile strength of between 350 and 550 Kgf/cm$^2$, and elongation of between 600 and 800%; and said abrasive particle layer has abrasive particles of No. 1000 (P1000) to No. 2000.

According to another embodiment of the present invention, said resin layer has the same characteristics as those of said resin film.

According to a further embodiment of the present invention, a rear surface of said resin film is provided with a pressure sensitive adhesion(PSA) layer for facilitating the use of the abrasive sheet by affixing said resin film to a sponge pad.

The present invention further provides a method of manufacturing an abrasive sheet, comprising the steps of: preparing a releasable film; forming a thin flexible resin film layer on a release agent applied surface of said releasable film; forming an abrasive particle layer on an upper surface of said resin film layer; removing said resin film having said abrasive particle layer formed thereon from said releasable film; and cutting said resin film with said abrasive particle layer formed thereon into any suitable size to form an abrasive sheet:

According to one embodiment of the present invention, said step of forming the resin film layer further includes: coating said release agent applied surface of said releasable film with a polyurethane resin, an emulsion including NBR, SBR or the like, and drying said coating.

BRIEF DESCRIPTION OF THE DRAWINGS

The present invention and its preferred embodiments will be described in greater detail with reference to the accompanying drawings, in which.

DESCRIPTION OF THE PREFERRED EMBODIMENTS

Figure 1:
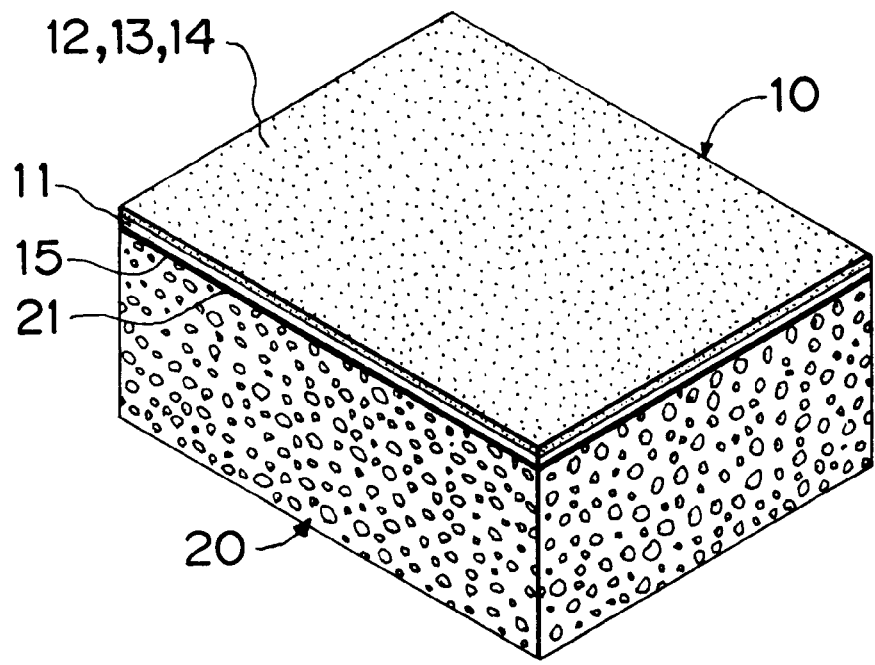
FIG. 1 is a perspective view showing a combination of an abrasive sheet according to one embodiment of the present invention and a sponge pad on which the abrasive sheet is mounted.
Figure 2:
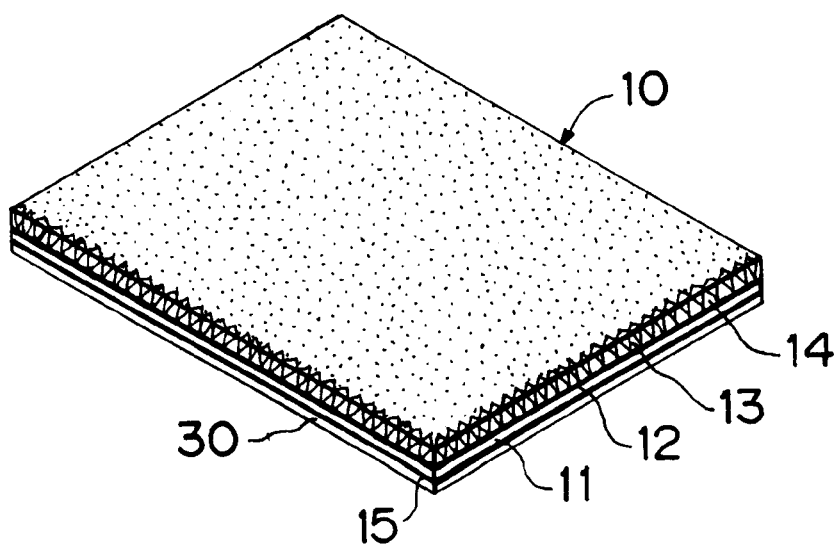
FIG. 2 is a perspective view showing an abrasive sheet with some exaggeration in the side edges thereof, which abrasive sheet is to be used for mounting on a sponge pad, as shown in FIG. 1.

FIG. 1 is a perspective view showing a combination of an abrasive sheet according to the present invention and a sponge pad on which the abrasive sheet is mounted; and FIG. 2 is a perspective view showing only an abrasive sheet which is to be used for mounting on a sponge pad, as shown in FIG. 1. As shown in FIGS. 1 and 2, the abrasive sheet 10 according to one embodiment of the present invention includes a flexible thin resin film 11; a very thin adhesive layer 12 formed on the surface of the resin film 11; abrasive particles 13 deposited on the adhesive layer 12; and an additional flexible thin resin film 14 formed on the abrasive particles 13. Referring to FIG. 2, the abrasive sheet 10 may be affixed to a releasable base board 30 through a PSA layer 15 formed on the resin film 11 at the opposite side to said thin resin film 14 to form an abrasive sheet assembly. Such an abrasive sheet assembly comprising the abrasive sheet 10 and the releasable base board 30 is extremely useful from the view point of handling and storage therefor.

When the sanding process for sanding, for example, a painted surface on an external plate of an automobile is to be done using the abrasive sheet 10, the abrasive sheet 10 together with the PSA layer 15 formed on the resin film 11 is removed from the releasable base board 30 of the abrasive sheet assembly. Thereafter, the abrasive sheet 10 is affixed to a flat surface 21 of a sponge pad 20 by putting the PSA layer 15 thereon. Then, the sanding or surface-conditioning process can rapidly and efficiently be done by using the abrasive sheet 10 while flowing the water from the sponge pad 20 onto the painted surface.

In the embodiment as described above, the resin film 11 of the abrasive sheet 10 may consist of any one of the water-proof flexible resins such as polyurethane resin, NBR, SBR and the like. The resin film 11 may have a thickness of between 10 and 100 $\mu$m, and more preferably between 20 and 50 $\mu$m. The abrasive particles 13 on the resin film 11 may have the grains of No. 400 (P400) to No. 4000, and more preferably No. 1000 (P1000) to No. 2000. In addition, the following factors are preferable for the flexibility that the resin film 11 should provide for attaining the advantageous effects as described below: a factor 100% M (modulus) in the range of between 10 and 200 Kgf/cm$^2$, and more preferably between 15 and 30 Kgf/cm$^2$; a tensile strength in the range of between 200 and 900 Kgf/cm$^2$, and more preferably between 350 and 550 Kgf/cm$^2$; and an elongation in the range of between 250 and 1000%, and more preferably between 600 and 800%. It is noted, here, that the factor "100% M" means the tensile strength at the elongation of 100% (i.e., when elongated at double).

Figure 3:
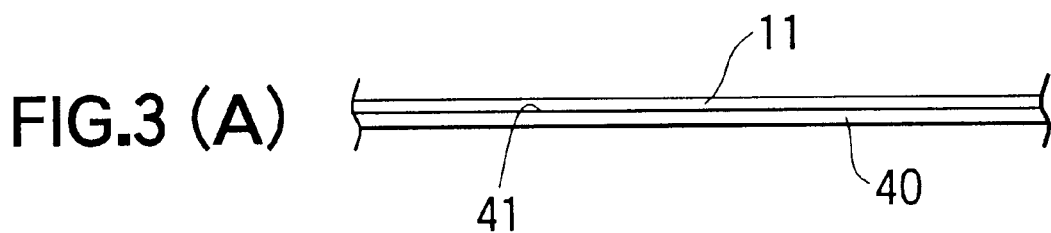
FIGS. 3(A), 3(B), 3(C), 3(D) and 3(E) are schematic views for sequentially explaining method of manufacturing an abrasive sheet according to one embodiment of the present invention.
Figure 3:
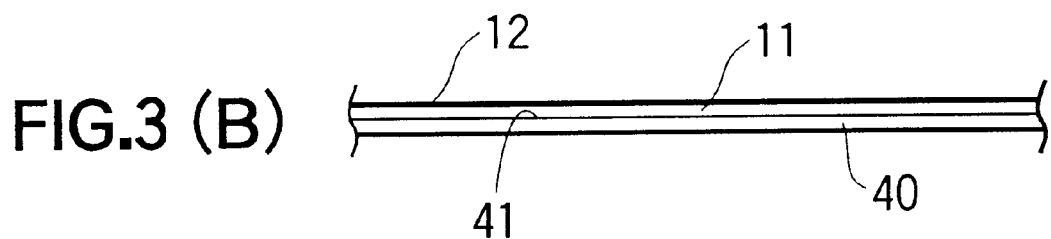
Figure 3:
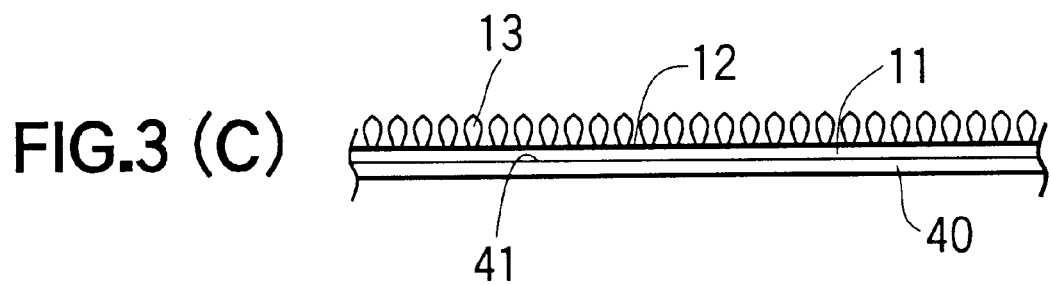
Figure 3:
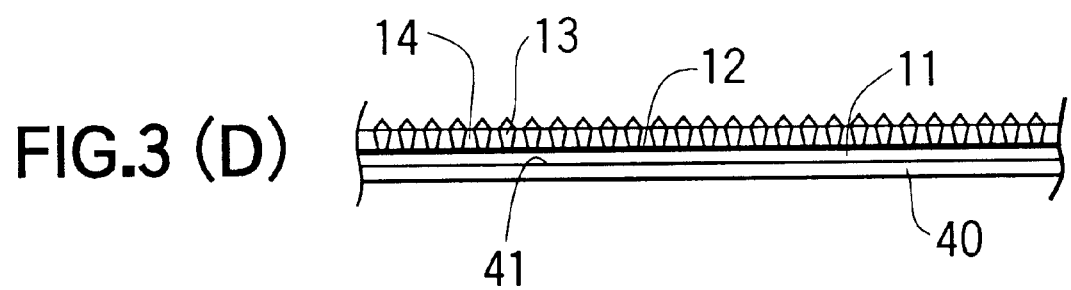
Figure 3:
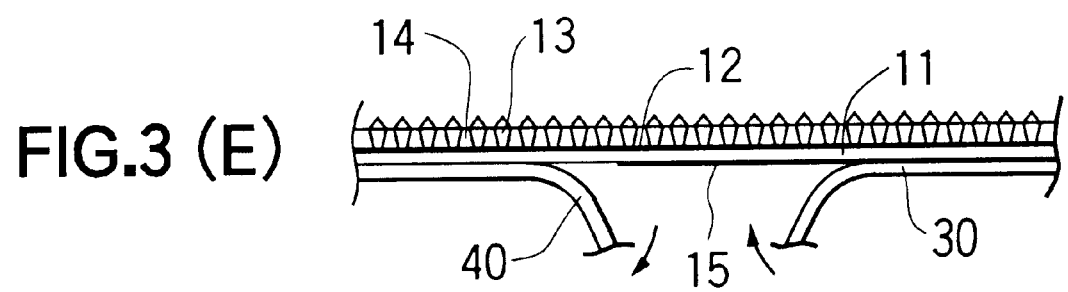

The manufacturing process for the abrasive sheet 10 according to the present invention will be described below in more detail. FIG. 3 schematically shows one embodiment of the manufacturing process for the abrasive sheet according to the present invention. More particularly, as shown in FIG. 3(A), a rigid releasable film 40 having suitable thickness is prepared; a release agent applied surface 41 of the film 40 is coated with a polyurethane resin, an emulsion including NBR, SBR or the like; and after drying, a thin flexible resin film 11 having the thickness of between 10 and 100 μm is formed thereon. The rigidity required for the releasable film 40 may be at such degree that it can prevent the thin flexible resin film 11 formed thereon from unnecessarily elongating and contracting in the subsequent manufacturing steps.

Then, as shown in FIG. 3(B), an upper surface of the thin flexible resin film 11 is coated with a layer 12 of solution including epoxy resin, phenolic resin, acrylic resine or the like, and abrasive particles 13 of No. 1000 (P1000) to No. 2000 are deposited thereon by an electrostatic deposition process (FIG. 3(C)). After drying of said solution, an adhesive layer 12 having the abrasive particles 13 deposited therein is formed. Then, as shown in FIG. 3(D), a solution including a flexible resin is applied over the adhesive layer 12 to form a thin flexible resin layer 14. It is preferable that the resin layer 14 is formed from the same material and has the same characteristics as those of the resin film 11, and the thickness of the resin layer 14 is about 70% of the height of the abrasive particles 13. In this embodiment the adhesive layer 12, the abrasive particles 13 and the resin layer 14 form "an abrasive particle layer".

Thereafter, as shown in FIG. 3(E), the resin film 11, together with the abrasive particle layer formed thereon, is removed from the release agent applied surface 41 of the releasable film 40. Then, a PSA layer 15 is formed on a rear surface of the resin film 11 at the opposite side to the abrasive particle layer. The abrasive sheet 10 having the PSA layer 15 formed on the rear side therof is then affixed to a releasable base board 30 to form an abrasive sheet assembly, as already described above. Finally, such abrasive sheet assembly comprising the abrasive sheet 10 and the releasable base board 30 is cut into any desired size, as shown in FIG. 2.

Figure 4:
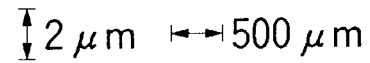
FIGS. 4(A), 4(B) and 4(C) are graphs showing roughness of the painted surfaces, as measured by a surface roughness measuring instrument (stylus tip angle at 90 degree and cone size of 5 $\mu$mR) in perpendicular to the sanding direction, in which the abscissa is graduated by a division of 500 $\mu$m and the ordinate by a division of 2 $\mu$m.
Figure 4:
Figure 4:
Figure 4:

The abrasive sheet 10 thus produced was tested in order to demonstrate its effectiveness and advantageous effects for an actual sanding operation of a painted surface, as described below. A painted surface having the roughness (or the orange peel) as shown in FIG. 4(A) was selected for an object to be sanded. Such painted surface was manually sanded by using a commercially available water-proof abrasive paper of No. 1500 while flowing the water onto the surface. The roughness of the surface produced by this sanding operation is shown in FIG. 4(B). For comparison, the painted surface as shown in FIG. 4(A) was similarly sanded, but by using No. 1500 abrasive sheet 10 of the present invention which was affixed to the sponge pad 20 as shown in FIG. 1. The roughness of the surface produced by this sanding is shown in FIG. 4(C). It is noted, in the graph of FIG. 4, that the abscissa is graduated at a division of 500 μm and the ordinate at a division of 2 μm (refer to upper right portion of FIG. 4).

Another test was conducted in order to compare the abrasion capability or sanding power provided by the prior art abrasive paper and the abrasive sheet of the present invention. FIG. 5(A) represents the roughness of a painted surface after it was manually sanded by using the commercially available water-proof abrasive paper of No. 1500, as measured in perpendicular to the sanding direction. Then, the painted surface having the roughness as shown in FIG. 5(A) was further sanded by using No. 1500 abrasive sheet 10 of the present invention which was affixed to the sponge pad 20 as shown in FIG. 1. This polishing operation was done on the surface area of 75 mm×200 mm for a period of 30 seconds, while flowing the water, but in the direction orthogonal to the polishing direction in the case of FIG. 5(A). The test result indicating the roughness of the surface produced by this polishing operation is shown in FIG. 5(B).

Figure 5:
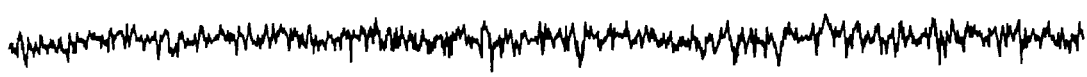
FIGS. 5(A), 5(B), 5(C), 5(D) and 5(E) are graphs showing roughness of the painted surfaces, as measured by a surface roughness measuring instrument (stylus tip angle at 90 degree and cone size of 5 $\mu$mR) in perpendicular to the sanding direction by water-proof abrasive paper, in which the abscissa is graduated at a division of 100 $\mu$m and the ordinate at a division of 1 $\mu$m.
Figure 5:
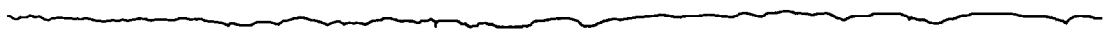
Figure 5:
Figure 5:
Figure 5:

In contrast thereto, FIG. 5(C) shows the test result for another case in which the painted surface having the roughness as shown in FIG. 5(A) was further polished by using the prior art abrasive means comprising a fine compound deposited on a sponge pad. This polishing operation was performed on the surface area of 75 mm×200 mm for a period of 30 seconds, but in the direction orthogonal to the polishing direction in the case of FIG. 5(A). FIG. 5(D) shows the roughness of the surface when such polishing operation was further continued for a period of 90 seconds, and FIG. 5(E) shows the roughness of the surface when such polishing operation was yet further continued for a period of 120 seconds. In the graph of FIG. 5, the abscissa is graduated at a division of 100 μm and the ordinate at a division of 1 μm (refer to upper right portion of FIG. 5).

The No. 1500 abrasive sheet according to the present invention used in the above tests had the following specifications:

Resin film 11:
Thickness: 30 μm
100% M: 22 Kgf/cm$^2$
Tensile strength: 450 Kgf/cm$^2$
Elongation: 700%
Adhesive layer 12:
Epoxy resin (epoxy equivalent: 200)
Curing agent: polyamide (amine value: 200)
Thickness: 3 μm
Voltage at deposition of abrasive particles: DC 40,000 volts Flexible resin layer 14:
Same resin as the resin film 11
Thickness: 7 μm An analysis of the test results will be described below. First, referring back to FIG. 4, the curve of FIG. 4(B) indicates that the recess portion of the surface can not be ground with the use of the water-proof abrasive paper, while the curve of FIG. 4(C) clearly indicates that such recess portion of the surface can surely be ground with the use of the abrasive sheet according to the present invention. In addition, by comparison of the curves of FIGS. 4(B) and (C), it is clearly apparent that the roughness of the surface produced by using No. 1500 abrasive sheet of the present invention becomes finer than that produced by No. 1500 water-proof abrasive paper (for comparison, the same grains of No. 1500 was used for both case).

Referring now to FIG. 5, by comparison of the curve of FIG. 5(A) representing the roughness of the surface produced by No. 1500 water-proof abrasive paper with the curve of FIG. 5(B) representing the roughness produced by No. 1500 abrasive sheet of the present invention, it is obvious that the roughness produced by the abrasive sheet of the present invention is extremely fine, although the measuring direction is different for both cases.

In addition, as is also apparent by comparison of the curves of FIGS. 5(B) and (C) for which the polishing was effected during the same time period of 30 seconds, the polishing power of the abrasive sheet of the present invention is much greater. The curve of FIG. 5(D) indicates that the coarse roughness still remains on the surface, and the curve of FIG. 5(E) indicates that the almost same fine roughness as in the case of the present invention is ultimately attained after polishing for a longer time period of 120 seconds.

The reason why such excellent polishing can be achived with the abrasive sheet according to the present invention is not clearly analyzed at present. It can, however, be considered that, due to the construction wherein the abrasive particle layer is formed on the flexible resin film, an expansion and contraction of such resin film can freely be produced during the polishing operation so that the abrasive particles in the abrasive particle layer can surely contact with the surface to be repaired, irrespective of any raised and/or recess portions present thereon.

It can also be considered that if the adhesive layer having the abrasive particles held therein is extremely thin and flexible, and especially, if the abrasive particles 13 and the adhesive layer 12 for affixing these particles 13 to the resin film 11 are sandwiched between the resin film 11 and the resin layer 14, because of high toughness and good expansion/contraction characteristics of both the resin film 11 and the resin layer 14, the degree that the abrasive particles 13 can freely move becomes much greater, and therefore, there is no possibility that the abrasive particles can deeply cut into the surface to be repaired, with the result that the roughness of the surface after the polishing operation becomes very fine, and a higher polishing power can be attained as compared to the prior art buffing process. Furthermore, when the abrasive sheet according to the present invention is affixed to the sponge pad, the abrasive sheet can behave as if it is a part of the sponge pad, which enables reliable polishing of any uneven surface having raised/recess portions thereon.

It is apparent from the foregoing that an abrasive sheet according to the present invention can provide higher polishing power during a polishing operation, but it polishes a surface while tracing or following any unevenness or orange peel on the surface. Therefore, the present invention provides a new and improved polishing tool that can replace the fine compound buffing process currently utilized in the automobile repairing industry in order to greately reduce the labor and the time period required for such polishing operation.

What is claimed is:

1. A method of manufacturing an abrasive sheet comprising:

forming a flexible resin film having a thickness of between 10 and 100 $\mu$m, 100% M of between 10 and 200 Kgf/cm$^2$, tensile strength of between 200 and 900 Kgf/cm$^2$, and elongation of between 250 and 1000%; and applying an abrasive particle layer, having abrasive particles with a grit designation in a range of P 400 to P 4000, on said flexible resin film.

2. A method of manufacturing an abrasive sheet comprising:

forming a flexible resin film having a thickness of between 20 and 50 $\mu$m, 100% M of between 15 and 30 Kgf/cm$^2$, tensile strength of between 350 and 550 Kgf/cm$^2$, and elongation of between 600 and 800%; and applying an abrasive particle layer having abrasive particles with a grit designation in a range of P 1000 to P 2000.

* * * * *